United States Patent
Howarter et al.

(10) Patent No.: US 8,428,436 B2
(45) Date of Patent: Apr. 23, 2013

(54) SYSTEM AND METHOD FOR EXTENDED RECORDING

(75) Inventors: Jamie Howarter, Overland Park, KS (US); Douglas Ceballos, Olathe, KS (US); Michael Lesher, Louisburg, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 357 days.

(21) Appl. No.: 12/613,364

(22) Filed: Nov. 5, 2009

(65) Prior Publication Data
US 2011/0103774 A1    May 5, 2011

(51) Int. Cl.
*H04N 5/76* (2006.01)
(52) U.S. Cl.
USPC .......................................... 386/291; 386/292
(58) Field of Classification Search ........... 386/291–299
See application file for complete search history.

(56) References Cited

U.S. PATENT DOCUMENTS

| | | | |
|---|---|---|---|
| 6,173,112 B1 | 1/2001 | Gruse et al. | |
| 7,805,055 B2 * | 9/2010 | Kimoto et al. | 386/291 |
| 7,853,120 B2 * | 12/2010 | Bumgardner et al. | 386/291 |
| 2002/0007426 A1 * | 1/2002 | Ando et al. | 710/25 |
| 2004/0101280 A1 * | 5/2004 | Tobiishi | 386/66 |
| 2005/0138672 A1 | 6/2005 | Stone | |
| 2007/0286582 A1 * | 12/2007 | Dolph | 386/112 |
| 2008/0307485 A1 * | 12/2008 | Clement et al. | 725/152 |

* cited by examiner

*Primary Examiner* — Thai Tran
*Assistant Examiner* — Nigar Chowdhury
(74) *Attorney, Agent, or Firm* — Patton Boggs LLP

(57) ABSTRACT

Embodiments of the disclosed invention include an apparatus, method, and computer program product for enabling a user to configure a media receiving device to auto-extend a recording of a program beyond its scheduled end recording time. For instance, in one embodiment, a computer implemented method for extending recording of a broadcast is disclosed. The method comprises recording a program associated with a broadcast signal until a scheduled ending time; determining whether an end of program indicator within the broadcast signal has been detected in response to reaching the scheduled ending time; and extending the recording of the program associated with the broadcast signal based upon a user selected setting associated with a set of user configurable options for extended recordings.

13 Claims, 4 Drawing Sheets

SYSTEM AND METHOD FOR EXTENDED RECORDING

BACKGROUND OF THE INVENTION

A digital video recorder (DVR) or personal video recorder (PVR) is a device that records video in a digital format to a disk drive or other memory medium within a device. The term includes stand-alone set-top boxes, portable media players (PMP) and software for personal computers which enables video capture and playback to and from a disk. Some consumer electronics manufacturers have started to offer televisions with DVR hardware and software built in to the television itself.

Currently, a user schedules a DVR to record programs using an electronic program guide that contains a time schedule of when programs are expected to be broadcasts. However, often the broadcast of a program may not occur exactly at the time of the scheduled broadcast. For example, a news alert may cause a scheduled program to start at a later time than a scheduled start time and thereby, causing the program to end at a later time than a scheduled end time. In other circumstances, a program may be longer than an expected scheduled length, e.g., a sporting event that goes into overtime. Therefore, a recording of the program may end before the actual broadcast of the program ends.

SUMMARY

Embodiments of the disclosed invention include an apparatus, method, and computer program product for enabling a user to configure a media receiving device to auto-extend a recording of a program beyond its scheduled end recording time. For instance, in one embodiment, a computer implemented method for extending recording of a broadcast is disclosed. The method comprises recording a program associated with a broadcast signal until a scheduled ending time; determining whether an end of program indicator within the broadcast signal has been detected in response to reaching the scheduled ending time; and extending the recording of the program associated with the broadcast signal based upon a user selected setting associated with a set of user configurable options for extended recordings.

BRIEF DESCRIPTION OF THE DRAWINGS

Illustrative embodiments of the present invention are described in detail below with reference to the attached figures, which are incorporated by reference herein and wherein.

DETAILED DESCRIPTION

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
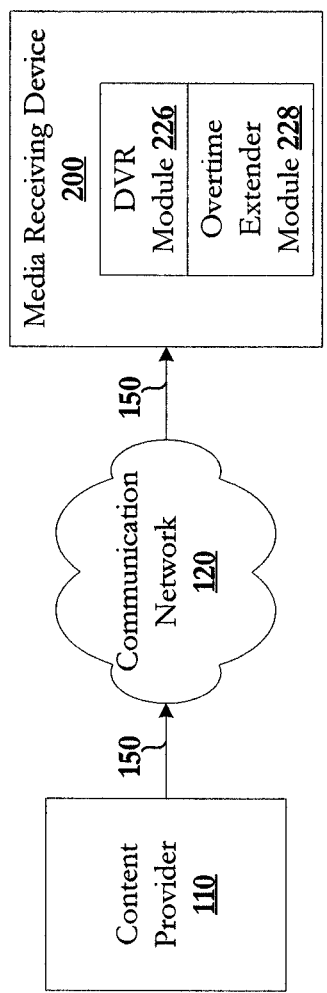
FIG. 1 depicts an embodiment of a network environment in which the illustrative embodiments may be implemented.

FIG. 1 depicts an embodiment of a network environment 100 in which the illustrative embodiments may be implemented. In the depicted embodiment, a content provider 110 transmits media content 150 to a media receiving device 200 via communication network 120. Content provider 110 may be, but is not limited to, a cable, satellite, Internet Protocol Television (IPTV)/Internet television provider, and/or a local television broadcasting station that provides media content 150 to consumers.

Media content 150 may include audio and video content, such as, but not limited to, a television program. In some embodiments, media content 150 may include additional information, such as, but not limited to, an electronic programming guide and/or other information associated with the transmitted audio and video content.

In some embodiments, communication network 120 may include, but is not limited to, one or more coaxial cable networks, fiber-optic networks, and/or satellite networks. In addition, in certain embodiments, communication network 120 may also include twisted pair networks and/or may communicate with one or more IP networks, such as, but not limited to, the Internet, for providing IPTV/Internet cable television-type services.

Media receiving device 200 may be any type of device capable of receiving and decoding media content 150, such as, but not limited to, a television, a set-top box, a digital video recorder, a personal computer, and/or a mobile device. As will be further described, in one embodiment, media receiving device 200 includes a digital video recorder (DVR) module 226 for enabling a user schedule and/or initiate recording of a program. As referenced herein, the term "program" refers to the audio and video content of media content 150. In addition, in accordance with certain embodiments, media receiving device 200 may include an overtime extender module 228 for enabling a user to configure options for dynamically extending the recording of a program beyond its scheduled end time if an end of program (EOP) indicator associated with a currently recorded program has not been detected by media receiving device 200.

Figure 2:
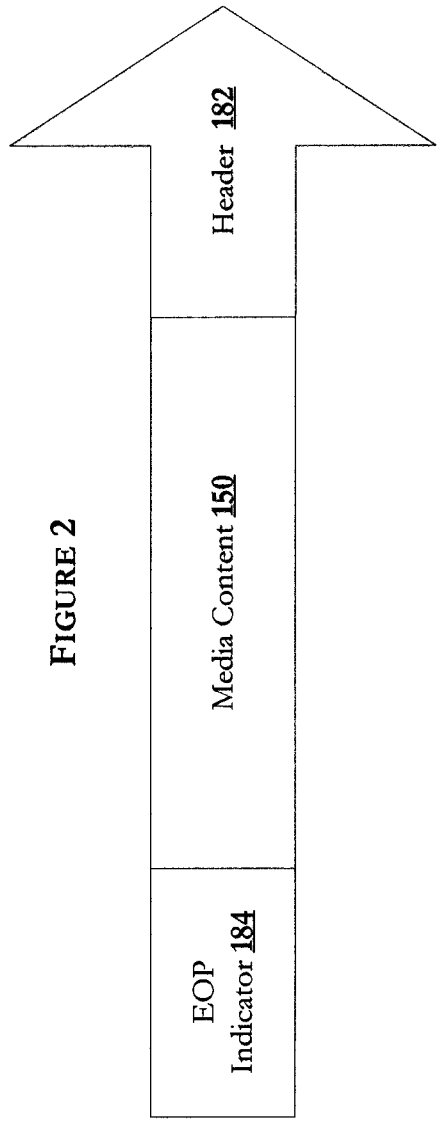
FIG. 2 illustrates a conceptual block diagram of a broadcast data stream in accordance with certain embodiments of the invention.

For example, FIG. 2 illustrates a conceptual block diagram of a data stream 180 for providing media content 150 to media receiving device 200 in accordance with certain embodiments of the invention. In the depicted embodiment, data stream 180 comprises a header 182, media content 150, and an end of program (EOP) indicator 184. In one embodiment, header 182 may include data that identifies media content 150, such as, but not limited to, a title, length, rating, description, and/or channel of a program corresponding to media content 150. As stated previously, media content 150 may include audio and video content, such as, but not limited to, a television program. End of program indicator 184 follows media content 150 to indicate the end of the transmission of media content 150. For instance, in one embodiment, if data stream 180 is in digital format, end of program indicator 184 may be a predetermined data stream, e.g., a bit stream of 22 consecutive 0's. In other embodiments, if data stream 180 is in analog format, end of program indicator 184 may be a signal having a predetermined frequency, such as, but not limited to, a pilot signal.

Figure 3:
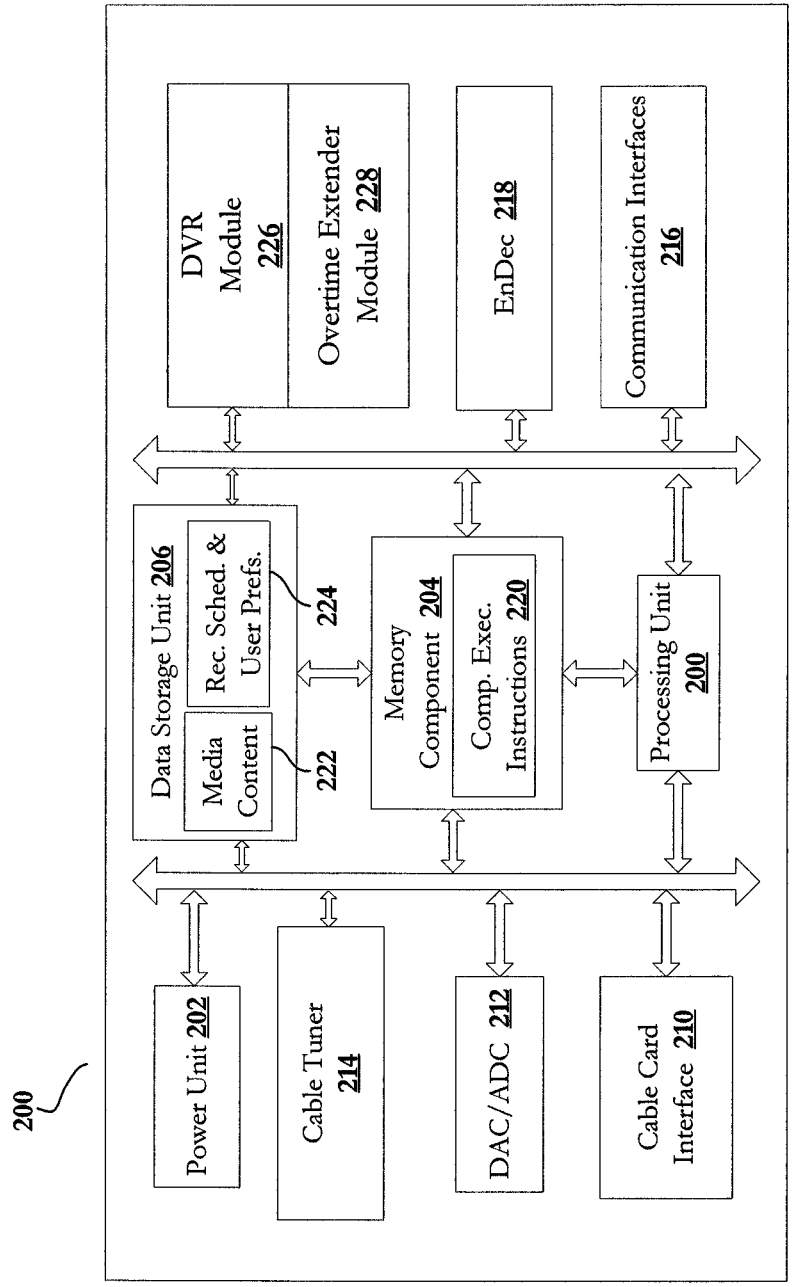
FIG. 3 illustrates an embodiment of a media receiving device in accordance with certain embodiments of the invention.

FIG. 3 illustrates an embodiment of media receiving device 200 in accordance with certain embodiments of the invention. In the depicted embodiment, media receiving device 200 comprises, among other components, a processing unit 200, a power unit 202, a memory component 204, a data storage unit 206, and a set of communication interfaces 216. In one embodiment, power unit 202 converts the input power from an AC adaptor to run various components of media receiving device 200. In addition, in some embodiments, power unit 202 may include an internal power source, such as, but not limited to, a battery component.

Processing unit 200 may comprise of one or more microprocessors for executing computer usable program code/instructions for dynamically extending the recording of a program beyond its scheduled end time. For example, in one embodiment, processing unit 200 executes computer executable instructions 220 stored in memory component 204 for enabling a user to configure a set of user configurable options associated with dynamically extending recordings of a program.

In one embodiment, memory component 204 may be volatile memory. Volatile memory is memory that loses its contents when media receiving device 200 loses power. For example, in some embodiments, memory component 204 may be random access memory (RAM). Random access memory stores currently executing instructions and/or data utilized by an operating system, software program, hardware device, and/or a user.

Data storage unit 206 is non-volatile memory, such as, but not limited to, one or more hard disk drives, that may be used to store permanent data on media receiving device 200. In some embodiments, data storage unit 206 may be an external hard drive, a solid state drive, and/or a network data storage unit. In other embodiments, data storage unit 206 may include flash memory, such as, but not limited to, an xD (extreme Digital) card, SD (Secure Digital) card, or mini SD card. In one embodiment, data storage unit 206 may be utilize to store recorded media content files 222, such as, but not limited to, television content received from content provider 110. In addition, in some embodiments, data storage unit 206 may store a recording schedule and user preferences 224 for recording media content.

For example, in a one embodiment, media receiving device 200 may include a digital video recorder (DVR) module 226 for recording and playback of media content files 222. As referenced herein, a module is defined as hardware, software, and/or a combination thereof for performing a particular function. Software is defined as computer executable instructions including, but not limited to, object code, assembly code, and machine code. Hardware may include, but is not limited to, one or more processors/microprocessors, electrical circuitry, and logic gates. For instance, digital video recorder module 226 may include hardware and/or software for decoding data stream 180 and for identifying end of program indicator 184. In some embodiments, digital video recorder module 226 includes instructions for enabling a user to initiate and/or schedule a recording of a program, set priority levels for resolving recording conflicts, and/or other options associated with the recording of a program, such as, but not limited to, recording all broadcasts of the same program, recording only new broadcasts of the program, and/or recording only one instance of the program. In addition, in accordance with one embodiment, digital video recorder module 226 may communicate with and/or include overtime extender module 228 for enabling a user to configure options for dynamically extending the recording of a program beyond its scheduled end time if an end of program (EOP) indicator associated with a recorded program has not been detected by media receiving device 200. For example, in one embodiment, overtime extender module 228 may include executable instructions for generating a user interface for enabling a user to select/configure one or more settings within a set of user configurable options for extended recordings. In addition, in some embodiments, overtime extender module 228 may also include executable instructions for extending the recording of a program associated with a broadcast signal based upon the one or more user-selected settings within the set of user configurable options for extended recordings.

In accordance with the disclosed embodiments, media receiving device 200 includes communication interfaces 216 for receiving media content signals/data from, but not limited to, content provider 110. In some embodiments, communication interfaces 216 may provide connection ports for coupling media receiving device 200 to one or more electronic devices. For example, in one embodiment, communication interfaces 216 includes a video output interface, such as, but not limited to, a coaxial cable connection for coupling media receiving device 200 to a display unit. In addition, in some embodiments, communication interfaces 216 may include an Ethernet port and/or a telephone line port for connecting media receiving device 200 to a network device over the telephone network and/or the Internet. In some embodiments, communication interfaces 216 may include other data communication interfaces, such as, but not limited to, a 1394 interface, a universal serial bus (USB) interface, and/or a high-definition multimedia interface (HDMI).

In addition, in some embodiments, media receiving device 200 may include a cable card interface 210 for interfacing with a plug-in cable/smart card that enables viewing and/or recording of cable television programming. For example, in some embodiments, cable card 210 comprises instructions and/or a decryption key for decoding encrypted cable television signals transmitted by content provider 110.

Media receiving device 200 may also include one or more encoder/decoder (EnDec) module 218 for decoding media content signals, such as, but not limited to, data stream 180 received from content provider 110. For example, in some embodiments, EnDec module 218 may be a MPEG encoder/decoder that is utilized to encode an analog television signal into MPEG format and/or decode a MPEG format signal for generating a viewable signal. MPEG encoder/decoder 250 may support one or more standards, such as, but not limited to, MPEG-2 format. MPEG-2 is a standard for the generic coding of moving pictures and associated audio information. MPEG-2 is widely used for digital television signals that are broadcast over-the-air, by cable, and by direct broadcast satellite TV systems.

In some embodiments, media receiving device 200 may also include one or more cable tuners 214. In one embodiment, cable tuner 214 may be a quadrature amplitude modulation (QAM) tuner. A QAM tuner is an electronic tuning device used to tune/decode media content signals that are encoded using quadrature amplitude modulation format. In other embodiments, cable tuner 214 may be an Advanced Television Systems Committee (ATSC) tuner/receiver. An ATSC tuner is a device that is used in the reception of digital television signals (DTV), including, but not limited to, high definition television (HDTV) signals, standard definition television (SDTV) signals, data broadcasting, multi-channel surround-sound audio, and satellite direct-to-home broadcasting. In addition, in some embodiments, cable tuner 214 may decompress and demodulate the inbound television signals and/or may convert analog television signals broadcasted over the air to a digital signal that can be manipulated, such as, but not limited to, media reformatting, for enabling viewing on a particular television set. Alternatively, and/or in addition to, in some embodiments, media receiving device 200 may include an analog-to-digital converter (ADC) and a digital-to-analog converter (DAC) 212 for converting between analog signals and digital format.

Figure 4:
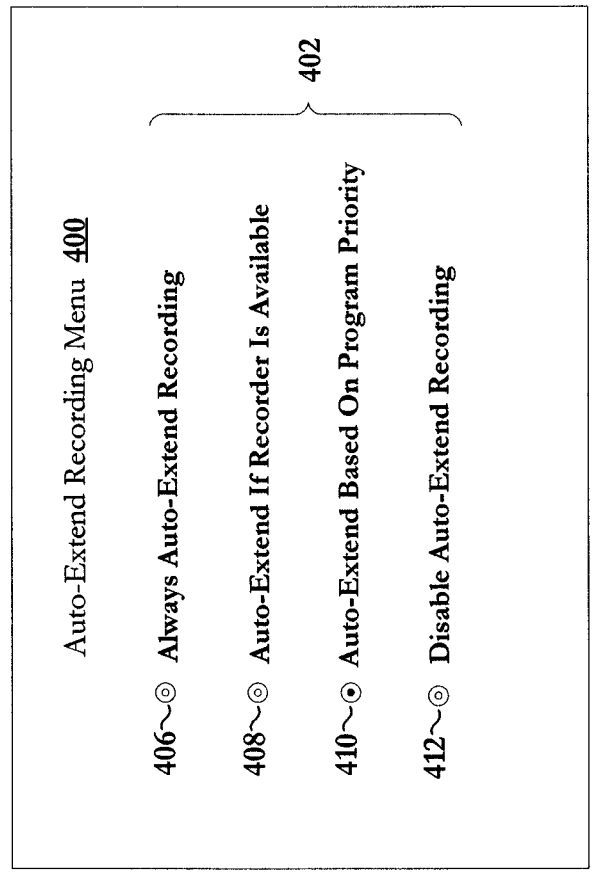
FIG. 4 illustrates an embodiment of a user interface that includes a set of user configurable options for extended recording.

With reference now to FIG. 4, an embodiment of a user interface 400 that includes a set of user configurable options for extended recording is illustrated. In some embodiments, user interface 400 may be utilized to configure recording for a single program and/or may be utilized to configure recording for all recordings. In one embodiment, user interface 400 includes four user configurable options 402 for dynamically extending the recording of a program beyond its scheduled end time. For instance, in the depicted embodiment, user interface 400 includes an Always Auto-Extend Recording option 406, an Auto-Extend If Recorder Is Available option 408, an Auto-Extend Based on Program Priority option 410, and a Disable Auto-Extend Recording option 412.

In one embodiment, Always Auto-Extend Recording option 406 may be utilized to enable extended recording of a program even if a conflict in recording schedule would result from the extension of the recording of the program. In other words, Always Auto-Extend Recording option 406 guarantees that a program will be recorded in its entirety until media receiving device 200 receives an end of program identifier.

Alternatively, Auto-Extend If Recorder Is Available option 408 may be utilized to enable extended recording of a program if a recorder is available. As referenced herein, a recorder is defined as one or more components of media receiving device 200, such as, but not limited to, cable tuner 214 and/or processing unit 202, that are utilized by media receiving device 200 to record/store a program. For example, in some embodiments, if media receiving device 200 only has one tuner, then Auto-Extend If Recorder Is Available option 408 will extend recording of a program as long as the tuner is not needed to view and/or record another program. In other embodiments, if media receiving device 200 has multiple recorders, then Auto-Extend If Recorder Is Available option 408 will extend recording of a program until media receiving device 200 receives an end of program identifier as long as at least one recorder is available.

Auto-Extend Based on Program Priority option 410 may be utilized to enable extended recording of a program if the program that is currently being recorded has a higher priority level setting than a conflicting scheduled program. For example, if the program currently being recorded has a priority level set to 4 and a conflicting scheduled recording program has a priority level of 3, then in one embodiment, Auto-Extend Based on Program Priority option 410 will extend the recording of the program currently being recorded until media receiving device 200 receives an end of program identifier or until a conflicting scheduled recording program has a higher priority level. In some embodiments, user interface 400 may include an option for resolving conflicting scheduled recording programs having the same priority level (not depicted). For instance, in one embodiment, a user may configure media receiving device 200 to resolve conflicting scheduled recording programs having the same priority level by continuing recording of the current program until media receiving device 200 receives an end of program identifier. Alternatively, in some embodiments, a user may decide to never auto-extend recording of a program beyond its scheduled recording time by selecting Disable Auto-Extend Recordings option 412.

Figure 5:
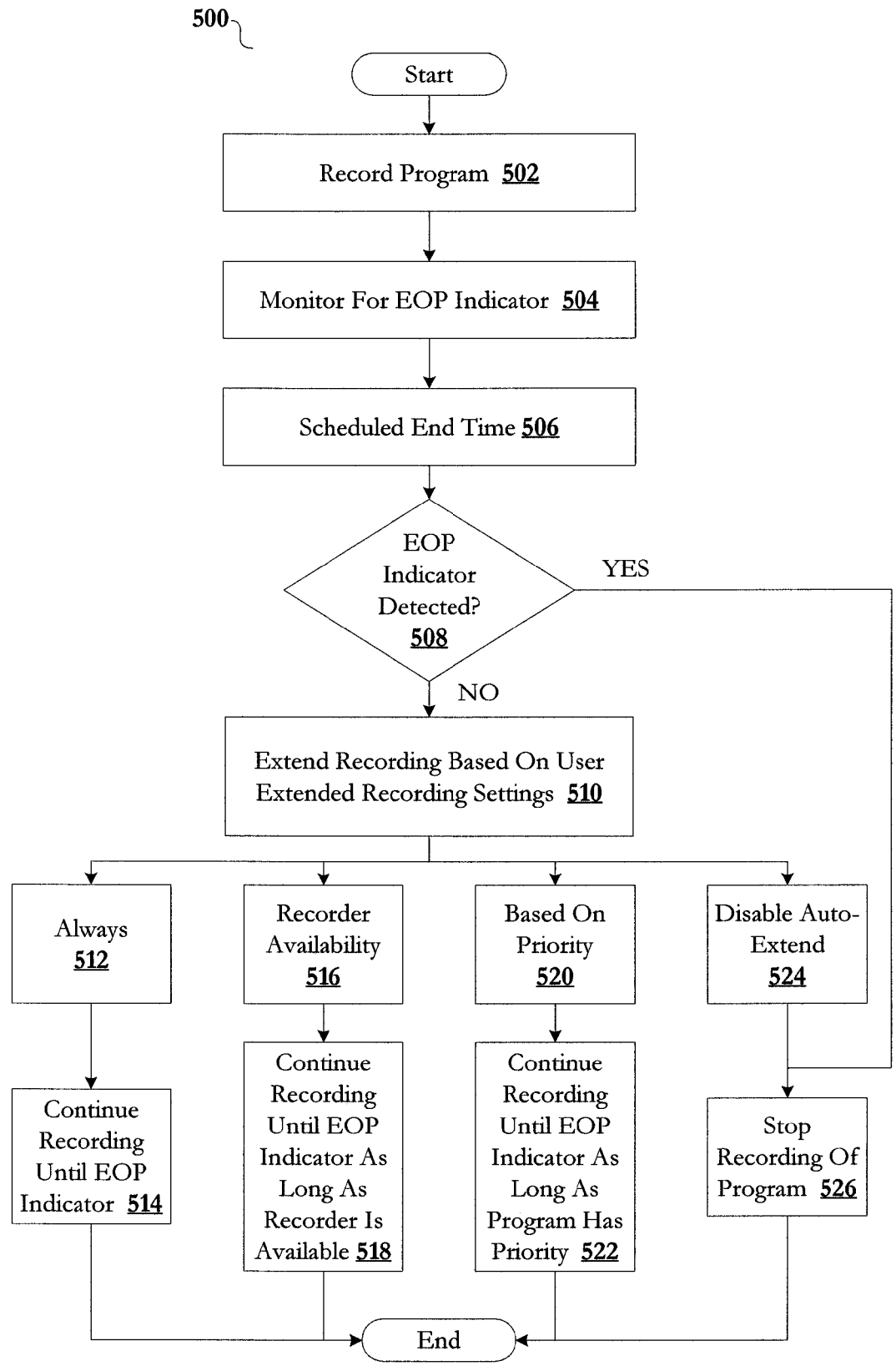
FIG. 5 illustrates an embodiment of a process for extended recording of a program in accordance with certain embodiments of the invention.

FIG. 5 illustrates an embodiment of a process 500 for extended recording of a program in accordance with certain embodiments of the invention. Process 500 may be executed by an audio/video receiving device, such as, but not limited to, media receiving device 200. Process 500 begins by initiating the recording of a program at block 502. At block 504, the process monitors the recording data stream for an end of program indicator associated with the recorded program. If the process reaches a scheduled end time for the program at block 506, the process, at block 508, determines whether the end of program indicator associated with the recorded program has been detected. If the process has detected the end of program indicator for the recorded program, the process terminates recording of the program at block 524, with process 500 terminating thereafter.

In one embodiment, if the process has not detected the end of program indicator for the recorded program by the scheduled end time, the process, at block 510, extends the recording of the program based upon a set of user configurable options for extended recordings. For instance, in one embodiment, if the set of user configurable options indicates to always extend the recording of the current program (block 512), the process, at block 514, continues to record the current program until media receiving device 200 receives an end of program identifier for the current program, with process 500 terminating thereafter. However, if the set of user configurable options indicates auto-extending recording if a recorder is available (block 516), then the process, at block 518, extends recording of the program until media receiving device 200 receives an end of program identifier for the current program as long as a recorder is available. Alternatively, if the set of user configurable options indicates auto-extending recording based on priority levels (block 520), the process determines whether the program that is currently being recorded has a higher priority than any conflicting scheduled program and if so, the process continues recording of the program until media receiving device 200 receives an end of program identifier for the current program as long as the current program has priority over any conflicting scheduled recording program (block 522). In one embodiment, the set of user configurable options may indicate not extending the recording of a current program beyond its scheduled end recording time (block 524). In this embodiment, the process, at block 526, stops the recording of the current program at its scheduled end recording time despite media receiving device 200 not having received an end of program identifier for the current program.

Accordingly, the above disclosure discloses several embodiments including a system and method for enabling a user to configure a media receiving device to auto-extend a recording of a program beyond its scheduled end recording time. The above disclosure describes certain embodiments of the claimed invention and is not intended to limit the scope of the claimed invention. In addition, the disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions, hardware components, and/or any combination thereof. In addition, the flowchart and block diagrams in the figures illustrate the architecture, functionality, and operation of possible implementations of systems, methods and computer program products according to various embodiments of the claimed invention. In this regard, each block in the flowchart or block diagrams may represent a module, segment, or portion of code, which may include one or more executable instructions for implementing the specified logical function(s). In some alternative implementations, the functions noted in the block may occur out of the order noted in the figures and/or may be omitted. In addition, two blocks shown in succession may, in fact, be executed substantially concurrently, or the blocks may sometimes be executed in the reverse order, depending upon the functionality involved.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

We claim:

1. A computer implemented method for extending recording of a broadcast, the method comprising:
    recording a program associated with a broadcast signal until a scheduled ending time;
    monitoring for an end of program indicator within the broadcast signal;
    responsive to a determination that the end of program indicator within the broadcast signal has not been detected by the scheduled ending time, extending the recording of the program associated with the broadcast signal based upon a user selected setting associated with a set of user configurable options for extended recordings, wherein the set of user configurable options includes a first option for always extending the recording until the end of program indicator within the broadcast signal has been detected, a second option for extending the recording of the program if a recorder is available, a third option for extending the recording of the program if the recorder is not available based on a priority level assigned to the program in comparison with a conflicting scheduled recording program, and a fourth option for disabling the auto extend recording feature;
    wherein the program and the conflicting scheduled recording program are each assigned a numerical priority level by a user; and
    wherein the third option of auto extending the recording if the recorder is not available based on the priority level assigned to the program in comparison with the conflicting scheduled recording program includes a fifth user selectable option for resolving a scenario when a first priority of the program and a second priority of the conflicting scheduled recording program are the same, wherein the fifth user selectable option enables a user to select whether the program or the conflicting scheduled recording program is recorded when the scenario occurs.

2. The method of claim 1, wherein the end of program indicator is a predetermined string of consecutive 0 bits.

3. The method of claim 1, wherein the broadcast signal is an analog signal and the end of program indicator is a signal having a predetermined frequency indicating an end to the program.

4. The method of claim 1, further comprising recording the program until the scheduled end time of the program even if the end of program indicator within the broadcast signal is detected prior to the scheduled end time of the program.

5. The method of claim 1, further comprising ending recording the program prior to the scheduled end time of the program in response to detecting the end of program indicator within the broadcast signal prior to the scheduled end time of the program.

6. A media receiving device comprising:
    a communication interface for receiving a broadcast signal containing media content;
    a memory component for storing computer executable instructions;
    a processing unit for executing the computer executable instructions to:
        record a program associated with the broadcast signal until a scheduled ending time;
        monitor for an end of program indicator within the broadcast signal;
    extend the recording of the program associated with the broadcast signal based upon a set of user configurable options for extended recordings in response to a determination that the end of program indicator within the broadcast signal has not been detected by the scheduled ending time, wherein the set of user configurable options includes a first option for always extending the recording until the end of program indicator within the broadcast signal has been detected, a second option for extending the recording of the program if a recorder is available, a third option for extending the recording of the program if the recorder is not available based on a priority level assigned to the program in comparison with a conflicting scheduled recording program, and a fourth option for disabling the auto extend recording feature;
    wherein the program and the conflicting scheduled recording program are each assigned a numerical priority level by a user; and
    wherein the third option of auto extending the recording if the recorder is not available based on the priority level assigned to the program in comparison with the conflicting scheduled recording program includes a fifth user selectable option for resolving a scenario when a first priority of the program and a second priority of the conflicting scheduled recording program are the same, wherein the fifth user selectable option enables a user to select whether the program or the conflicting scheduled recording program is recorded when the scenario occurs.

7. The media receiving device of claim 6, further comprising a cable tuner for decoding the broadcast signal.

8. The media receiving device of claim 6, further comprising a recorder module for enabling a user to schedule recording of the program.

9. The media receiving device of claim 6, further comprising an overtime extender module for enabling a user to configure options for dynamically extending the recording of the program beyond the scheduled ending time if the end of program indicator associated with the program has not been detected by the media receiving device.

10. A computer program product comprising a tangible, non-transitory, computer readable medium having a computer readable program code embodied therein, said computer readable program code comprising instructions to cause a media receiving device to:

record a program associated with the broadcast signal until a scheduled ending time;

monitor for an end of program indicator within the broadcast signal;

determine whether an end of program indicator within the broadcast signal has been detected by the media receiving device in response to reaching the scheduled ending time, wherein recording of the program is continued until the scheduled ending time in response to detecting the end of program indicator prior to the scheduled ending time;

extend the recording of the program associated with the broadcast signal based upon a user selected setting associated with a set of user configurable options for extended recordings in response to a determination that the end of program indicator within the broadcast signal has not been detected by the scheduled ending time, wherein the set of user configurable options includes a first option for always extending the recording until the end of program indicator within the broadcast signal has been detected, a second option for extending the recording of the program if a recorder is available, a third option for extending the recording of the program if the recorder is not available based on a priority level assigned to the program in comparison with a conflicting scheduled recording program, and a fourth option for disabling the auto extend recording feature;

wherein the program and the conflicting scheduled recording program are each assigned a numerical priority level by a user; and wherein the third option of auto extending the recording if the recorder is not available based on the priority level assigned to the program in comparison with the conflicting scheduled recording program includes a fifth user selectable option for resolving a scenario when a first priority of the program and a second priority of the conflicting scheduled recording program are the same, wherein the fifth user selectable option enables a user to select whether the program or the conflicting scheduled recording program is recorded when the scenario occurs.

11. The computer program product of claim 10, wherein the computer readable program code further comprises instructions to generate a user interface comprising of the set of user configurable options for extended recording of the program beyond the program's scheduled ending time.

12. The computer program product of claim 10, wherein the computer readable program code further comprises instructions to stop recording of the program at the scheduled ending time in response to a determination that the end of program indicator within the broadcast signal is detected prior to the scheduled ending time.

13. The computer program product of claim 10, wherein the computer readable program code further comprises instructions to stop recording of the program as soon as the end of program indicator within the broadcast signal is detected.

* * * * *